(12) United States Patent
Umlor

(10) Patent No.: US 8,800,213 B2
(45) Date of Patent: *Aug. 12, 2014

(54) CONTINUOUS HEAT WELDED FLEXIBLE PVC MEMBRANE WITH AN INTERLOCKING VAPOR BARRIER SYSTEM AND INCLUDING SENSOR DETECTION FEATURES ASSOCIATED WITH EACH OF A PLURALITY OF OVERLAPPING MEMBRANE SECTIONS

(76) Inventor: Terry Umlor, Kingsley, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/444,127

(22) Filed: Apr. 11, 2012

(65) Prior Publication Data

US 2012/0192511 A1 Aug. 2, 2012

Related U.S. Application Data

(63) Continuation-in-part of application No. 12/770,073, filed on Apr. 29, 2010, now Pat. No. 8,156,700.

(60) Provisional application No. 61/248,653, filed on Oct. 5, 2009.

(51) Int. Cl.
*E04D 1/36* (2006.01)
*E04D 3/38* (2006.01)
*E04D 13/14* (2006.01)

(52) U.S. Cl.
USPC .......................................................... 52/60

(58) Field of Classification Search
USPC ........ 52/219, 220.8, 58, 60, 248, 1, 514, 156, 52/61
See application file for complete search history.

(56) References Cited

U.S. PATENT DOCUMENTS

| | | | | |
|---|---|---|---|---|
| 3,967,197 | A * | 6/1976 | Anderson | 324/664 |
| 4,086,736 | A * | 5/1978 | Landrigan | 52/220.8 |
| 4,441,743 | A * | 4/1984 | Steenbergen | 285/21.2 |
| 4,598,273 | A * | 7/1986 | Bryan et al. | 340/539.26 |
| 4,625,469 | A * | 12/1986 | Gentry et al. | 52/3 |
| 5,081,422 | A * | 1/1992 | Shih | 324/693 |
| 5,648,724 | A * | 7/1997 | Yankielun et al. | 324/533 |
| 7,574,320 | B2 * | 8/2009 | Corwin et al. | 702/127 |
| 2005/0000585 | A1* | 1/2005 | Betley et al. | 138/178 |
| 2010/0109318 | A1* | 5/2010 | Mulligan | 285/42 |

* cited by examiner

*Primary Examiner* — Brian Glessner
*Assistant Examiner* — Paola Agudelo
(74) *Attorney, Agent, or Firm* — Douglas S. Bishop

(57) ABSTRACT

An assembly for sealing an exposed surface including a plurality of thermoformed and individually sealing membrane sections, each provided in sheet form and configured for applying over an exterior of the surface. The membranes are directly heat welded to one another along overlapping edges in order to create a sectionalized and continuous vapor barrier across the surface. A sensor is integrated into any one or more selected membrane sections. The sensor incorporates a power supply, a processor and a transmitter which is communicable with a remote monitoring device in order to notify of a problem within any specified membrane section.

19 Claims, 10 Drawing Sheets

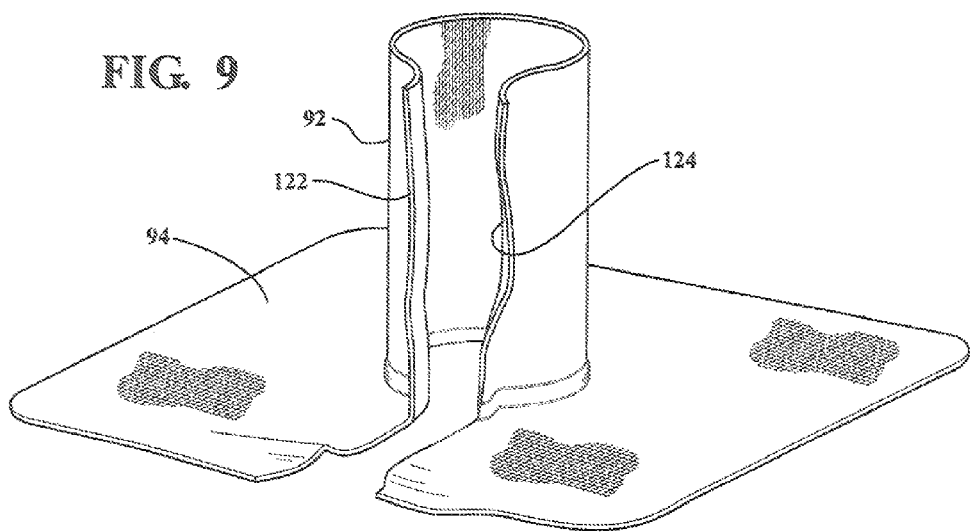
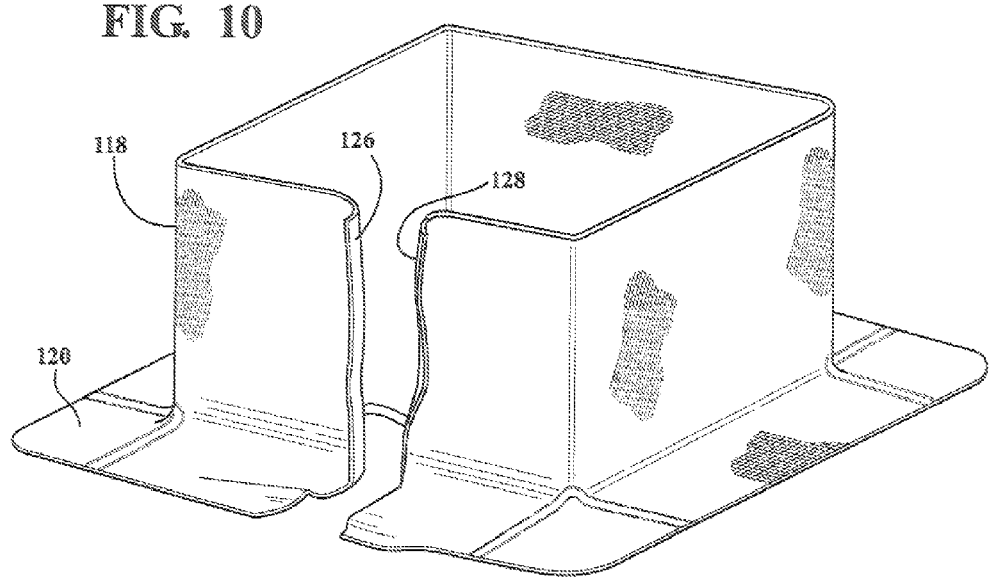

CONTINUOUS HEAT WELDED FLEXIBLE PVC MEMBRANE WITH AN INTERLOCKING VAPOR BARRIER SYSTEM AND INCLUDING SENSOR DETECTION FEATURES ASSOCIATED WITH EACH OF A PLURALITY OF OVERLAPPING MEMBRANE SECTIONS

CROSS-REFERENCE TO RELATED APPLICATIONS

The present application claims the priority of U.S. Utility application Ser. No. 12/770,073 filed Apr. 29, 2010, which in turn claims the priority of U.S. Provisional Patent Application Ser. No. 61/092,706 filed Aug. 18, 2009, as well as U.S. Provisional Patent Application Ser. No. 61/248,653 filed Oct. 5, 2009.

FIELD OF THE INVENTION

The present invention is generally concerned with the construction of a seamless covering, including membrane and insulation, associated with a roof and which includes both ductwork and piping which penetrates through a hole in the roof surface. More specifically, the present invention discloses a plurality of heat welded and continuous PVC membrane sheets, such as supported upon exterior rooftops. Additional subassemblies are configured for applying about running lengths of ductwork, as well as particularly to piping and which are formed into a series of interlocking sections to create an impermeable vapor barrier system in which a break in a given section does not otherwise compromise the integrity of the remaining sections.

Additional features include the incorporation of sensors (including such as for detecting any one or more of pressure, moisture, gas and/or temperature) into each of a plurality of interconnected and individually sealed envelopes, with intermittent vapor blocks likewise being formed in each individual section and extending along the length of the conduit (or within overlapping and edge connecting individual flattened roof sections). Further incorporated into each sensor is a mini-processor and transmitter, this communicating via a wire antenna which projects through the membrane construction of the envelope and communicable with a remote located receiver in order to provide for remote detection of a problem (such as tearing of the membrane) associated with that specific cell or envelope.

BACKGROUND OF THE INVENTION

Building facilities include such as those providing food processing abilities requiring the use of coolers and freezers, the associated equipment required for running these typically circulating liquids at a number of different temperatures ranging from below to above freezing at a given ambient atmospheric pressure. Piping extending between associated items of equipment can further extend over long running lengths both above and below an associated rooftop of the facility.

As is further known, such pipes require an over-layering of insulation in order to maintain its interior (usually chilled) temperature. Given the physical nature of a cold exterior of an exposed pipe to attract moisture, known insulation systems have been quickly compromised as a result of the moisture buildup intermixing with the insulation and freezing the same over the pipe.

SUMMARY OF THE INVENTION

The present invention discloses a plurality of heat welded and continuous PVC membrane sheets which are configured for applying over such as an exterior rooftop, with additional subassemblies configured for applying about running lengths of ductwork as well as configured for application over piping, such as which penetrates a hole in the roof surface and which is formed into a series of interlocking sections to create an impermeable vapor barrier system in which a break in a given section does not otherwise compromise the integrity of the remaining sections.

In piping applications, the pipe is first primed, following which a layer of insulation is applied with a succeeding layer of a thermoplastic olefin (TPO) or polyvinyl chloride (PVC) of wrapping added. A seamless bonded material is then overlapped over an end section of the wrapping in the form of a pre-manufactured boot (such as dimensioned to the outer diameter of the insulation and wrapping) and which is constructed of a heat welded polymer and insulation and which is formed over around a given running length of the pipe. The boot is provided at the location in which the pipe projects from the roof and is bonded together to the overall wrap circumference.

A nipple portion of the boot placed over a volume of putty and bonded with a surrounding fastener directly to the pipe. The outer membrane (TPO or PVC) of each subsequent section of pipe is heat bonded in a further overlapping fashion to the outer diameter extending edges of the outermost TPO or PVC pipe wrap proximate to its reduced diameter nipple connection. The outer wrapping is broken at periodic sections to provide a thermal break and absolute vapor barrier for each section.

A similar application is provided for covering any three dimensional ductwork supported in extending fashion above the roof surface, such as upon vertical supports, and again includes overlaying insulation and flexible outer PVC membranes in combination with heat sealing flex corners and custom boots. A separation washer is incorporated underneath the ductwork and insulation.

Additional features include the incorporation of an arrangement of sensors, such as which are capable of detecting any one or more parameters not limited to pressure, moisture, gas detection, temperature and the like. The sensors are incorporated into each of a plurality of interconnected and individually sealed envelopes, with intermittent vapor blocks likewise being formed in each individual section and extending along the length of the conduit (or within overlapping and edge connecting individual flattened roof sections). Further incorporated into each sensor is a mini-processor and transmitter, this communicating via a wire antenna which projects through the membrane construction of the envelope and communicable with a remote located receiver in order to provide for remote detection of a problem (such as tearing of the membrane) associated with that specific cell or envelope.

BRIEF DESCRIPTION OF THE DRAWINGS

Reference will now be made to the attached drawings, when read in combination with the following detailed description, wherein like reference numerals refer to like parts throughout the several views, and in which:

FIG. 9 is a sectional perspective illustration of an open boot, such as shown in cutaway plan view in FIG. 4, and which is again associated with a generally rounded cross sectional pipe;

FIG. 10 is a succeeding sectional perspective illustration of a further variant of open boot associated with a roof projecting location of a square shaped ductwork;

DETAILED DESCRIPTION OF THE PREFERRED EMBODIMENTS

The present invention discloses a continuous heat welded flexible PVC membrane incorporated into an interlocked vapor barrier system. Specifically, the vapor barrier system provides, in one non-limiting application, a seamless roofing installation in which a rooftop surface and all projecting conduit, including piping and ductwork, are covered by sheets of PVC or TPO membrane.

As will be further described, the present invention incorporates a number of variants of sealed membrane including application to both planar areas (such as rooftops) and/or applications to conduit (defined as piping and/or ductwork). The present invention includes other variants not necessarily limited to rooftop applications, and which can include such as interior or underground applications, such as associated but not limited to the oil and gas industries.

In reference to the illustrated embodiments set forth, subset applications are described below and include, in one variant, the provision of a boot formed about a pipe with insulation overwrap and which bonds about the pipe at a penetrating location through a roof. Succeeding overwrap sections are provided and engaged in end to end and partially overlapping fashion. Similar overwrapping applications are incorporated into roof projecting lengths of ductwork and include over layers of duct insulation, flexible membrane vapor seals and flex corners, and the provision of underside washers incorporating into ductwork supports.

Figure 1:
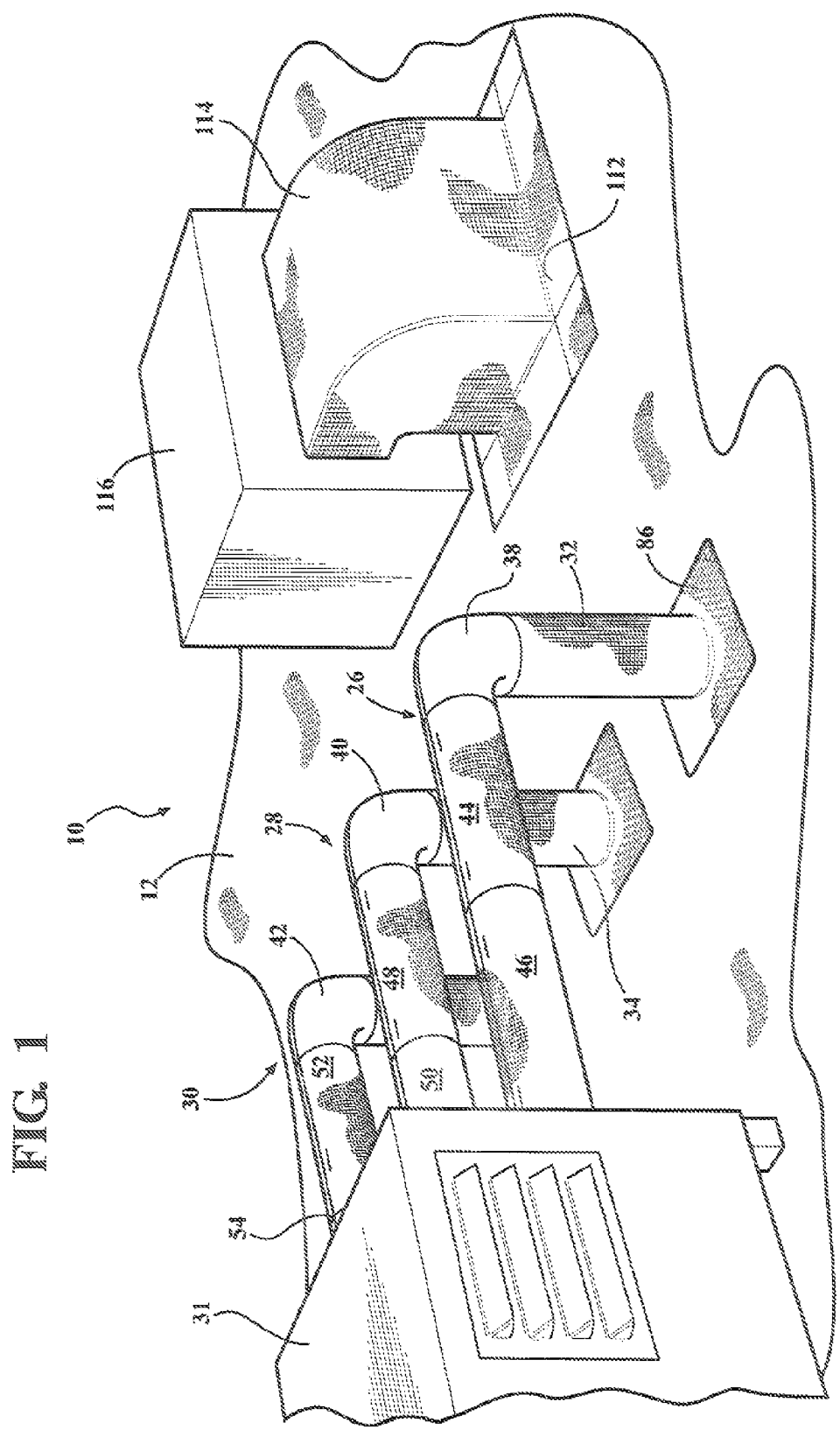
FIG. 1 is an environmental view of the continuous heat welded flexible PVC membrane with interlocked vapor barrier system applied to each of a roof, mechanical piping and HVAC ductwork according to one non-limiting embodiment of the invention.

Referring first to FIG. 1, an environmental view is generally shown at 10 of the continuous heat welded flexible PVC membrane with interlocked vapor barrier system applied to collectively to each of a roof, mechanical piping and HVAC ductwork according to one non-limiting embodiment of the invention. A first roof top supported subassembly is depicted by a single flat membrane illustrated at 12 however, and as further shown in FIG. 8, can be understood as provided by a plurality of individual sheets 14, 16, 18, et seq. which are arranged in aligning and edge overlapping fashion, and which are further heat bonded to one another along the overlapping locations indicated at 20, 22, and 24 established between the three sheets 14, 16 and 18 in the example shown. The membranes can further exhibit any desired thickness, such as ranging from a few mils up to ¼" or greater.

The membrane sheets or rolls are constructed of a polyvinyl chloride (PVC) or thermoplastic polyolefin (TPO) or other suitable material and can exhibit any desired sheet width, length and thickness. It is further understood and envisioned that the membrane construction can further include any type of waterproof film or layer which may be heat sealed to such as an adjoining edge of a consecutive and overlapping membrane. Although not shown, it is further envisioned that the membrane sheets can also be provided in roll form and which are further capable of being easily sectioned or trimmed in order to cooperate with penetrating pipe and HVAC locations as well as other rooftop located obstacles both within and about a defined installation perimeter.

Figure 2:
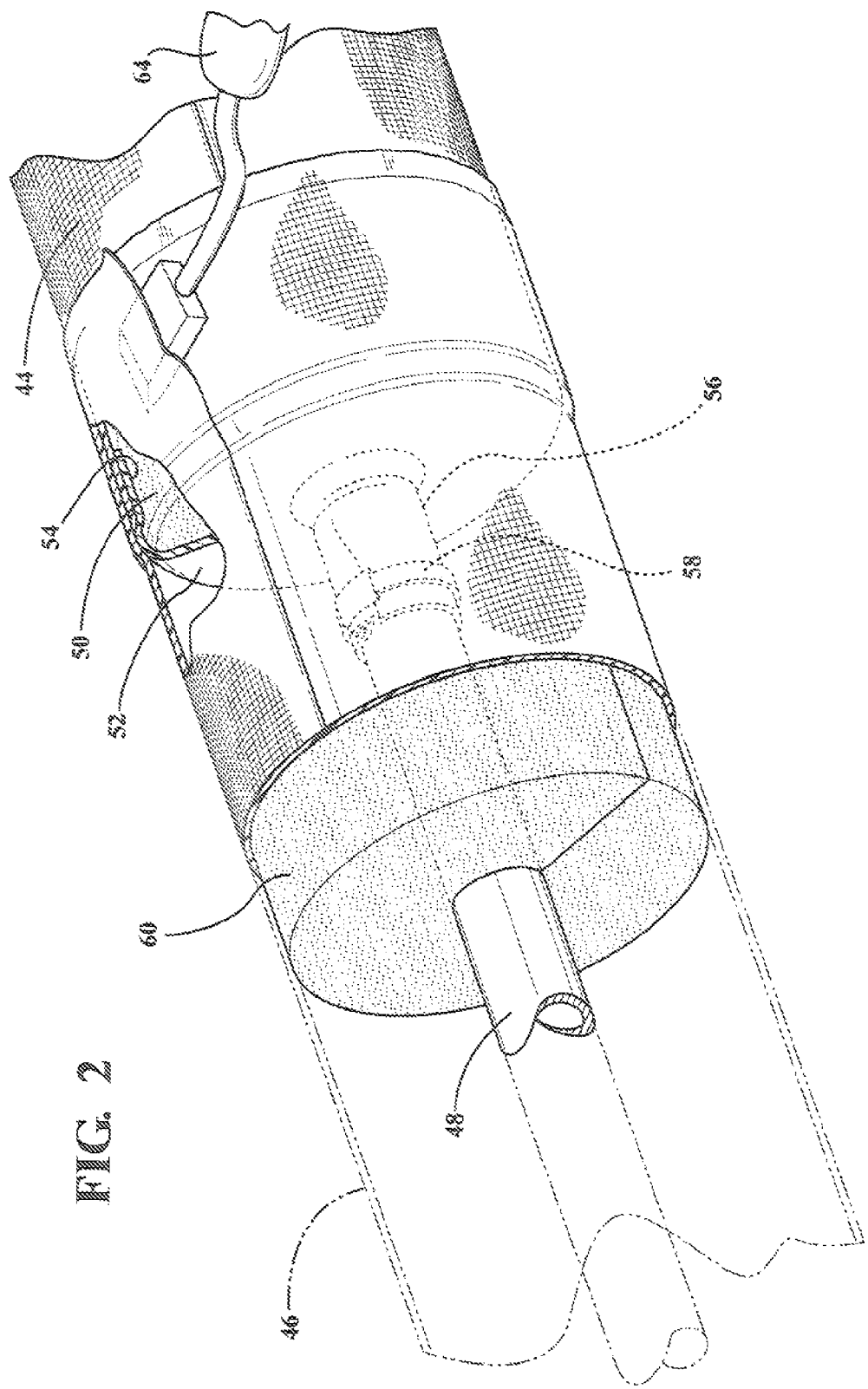
FIG. 2 is a sectional perspective of a sub-application of the flexible membrane applied in partially overlapping and succeeding sections to a running length of pipe.
Figure 3:
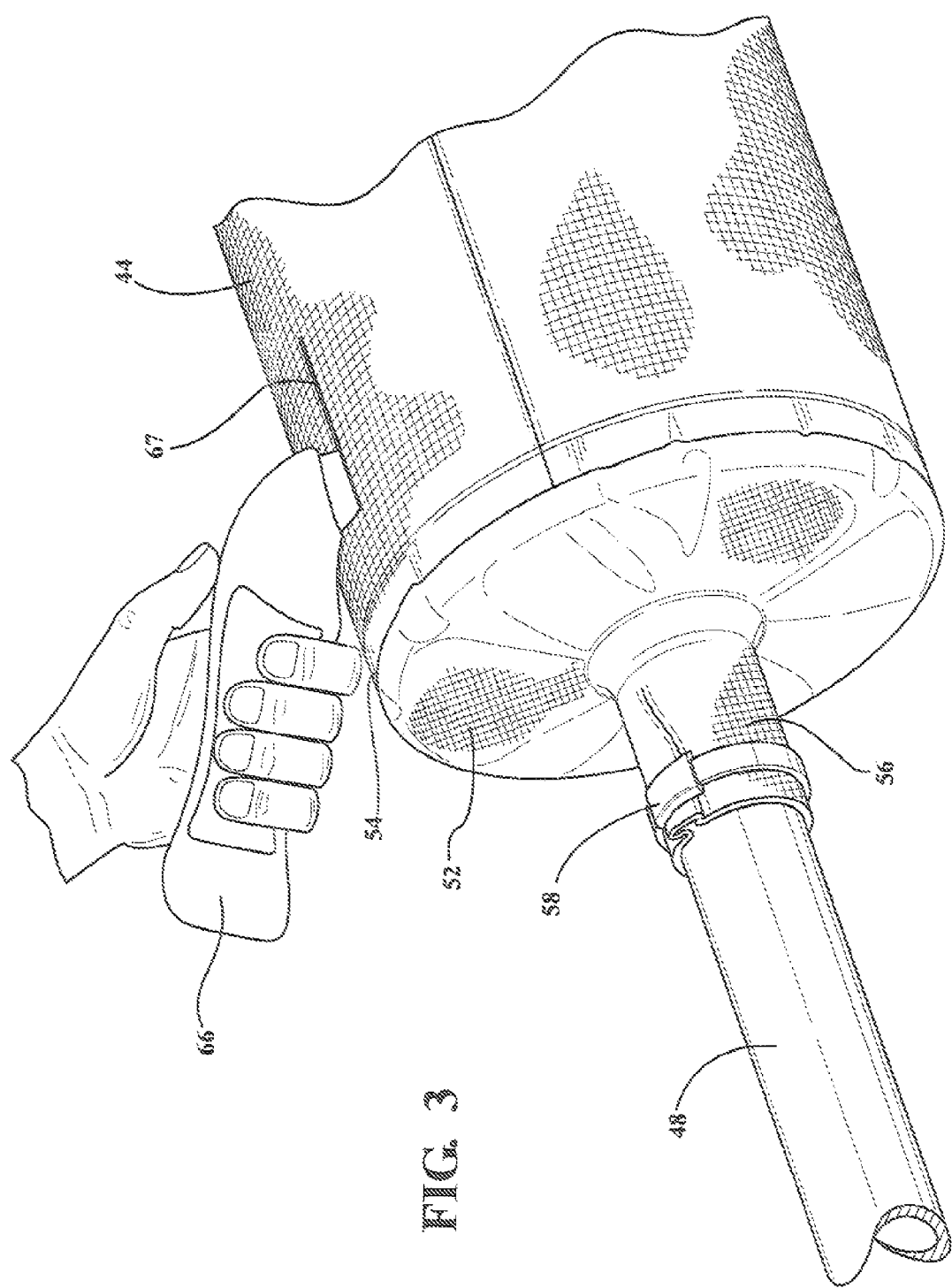
FIG. 3 is an illustration similar to FIG. 2 and further showing the application of a manual incision for providing a break in the thermal wrapping at periodic sections and in order to maintain and absolute vapor barrier for each section.
Figure 4:
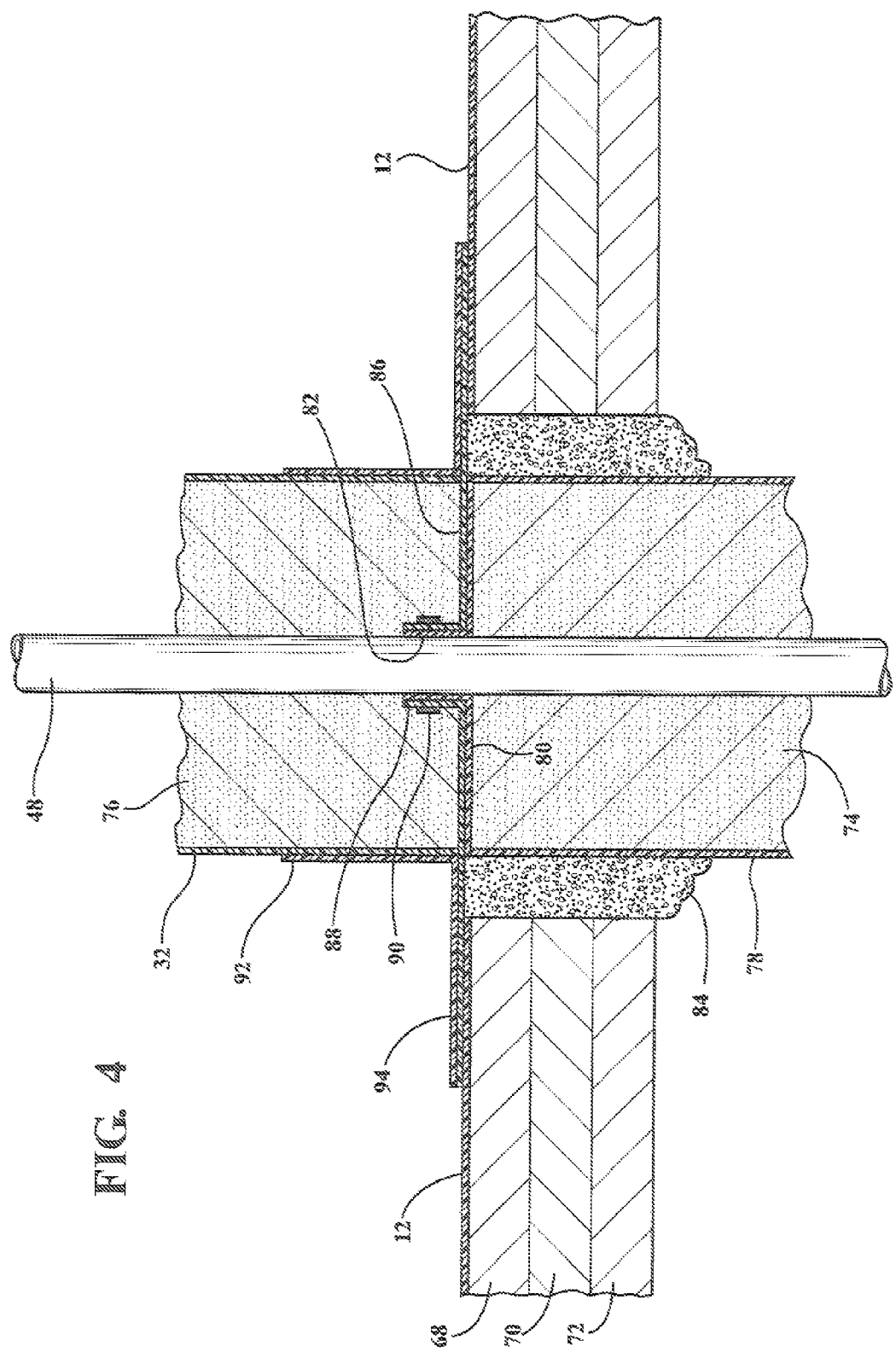
FIG. 4 is a sectional cutaway of a pipe at a penetrating location through a roof aperture and further illustrating the features of a sealing subassembly including insulation, outer wrapping and a pre-manufactured boot applied in succession around the pipe.
Figure 5:
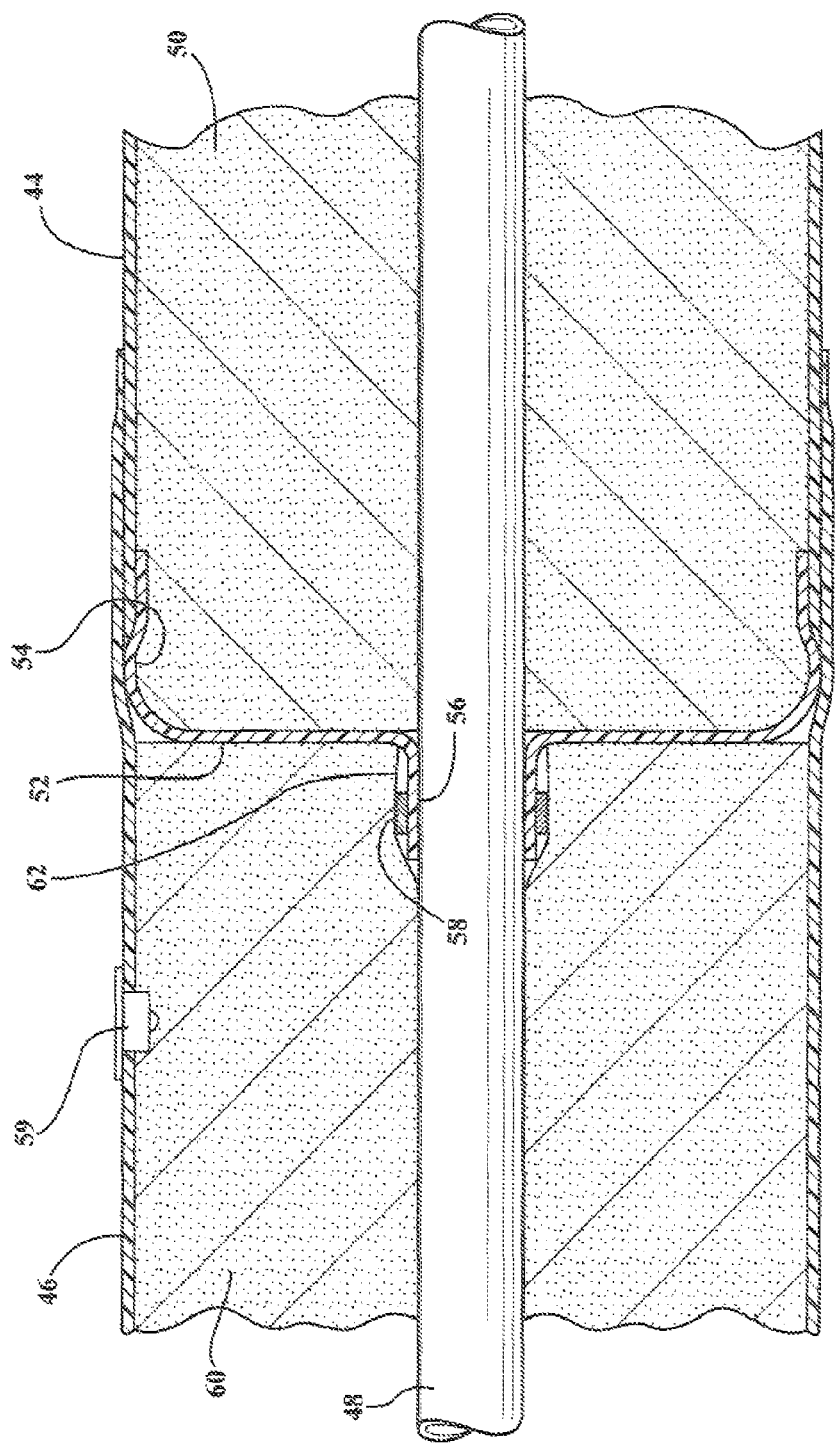
FIG. 5 is a plan cutaway view similar to that shown in FIG. 2 and illustrating from another vantage point the overlapping relationship established between a pair of succeeding and interlocking sections of piping overwrap, as well as illustrating one variant of a pressure sensor applied within the exterior skin of the sealed membrane for reflecting any changes in pressure resulting from compromise of the underlying piping or ductwork.

Referring again to FIG. 1 in combination with FIGS. 2, 3 and 5, a description is provided of individual sections of interlocking membrane provided about a pipe, in combination with a further membrane (FIG. 4) interlocking membrane section constructed with a custom boot for sealing a location of the pipe where it penetrates an aperture in an underlying roof. As shown in the example of FIG. 1, a series of three pipes are generally shown at 26, 28 and 30 extending respectively through apertures in the roof to a piece of rooftop located equipment 31. Each of the pipes (hidden from view in FIG. 1) are covered by a series of interconnected and overlapping membrane covered sections, these including first bottom most sections incorporating a custom boot and shown at 32, 34 and 36, succeeding intermediate and custom flex corner section 38, 40 and 42 and further overlapping and interconnecting sections 44-46, 48-50 and 52-54 leading respectively to the rooftop located equipment 31.

Referring now to FIG. 2, a sectional perspective is shown of a sub-application of the flexible membrane applied in partially overlapping and succeeding sections, such as corresponding to sections 44 and 46 shown in FIG. 1, of a running length of pipe identified at 48. In application, the pipe 48 is first primed, following which a layer of an insulating material 50 (as best shown in FIG. 4) is applied according to a desired material construction and thickness in generally rolled fashion about the pipe 48.

A boot, see as best shown in FIGS. 2 and 5, exhibits a generally modified funnel shape with a generally flattened central disc exhibiting a radial extending profile 52 and terminating both at an outer diameter in a first angled lip edge 54 covering an associated edge of the insulating material 50, as well as at an opposite directed and inner (narrowest diameter) lip edge 56 directly contacting the pipe 48. Although not shown, it is understood that the boot exhibits an incised extending edge which permits the boot to be fashioned about any type of conduit (pipe or ductwork), such edge being initially heat staked or welded and prior to successive heat staking of the angled edges of the boot to the interfacing membrane sections of the roof and conduit. A mechanical fastener 58 (such as a band or clamp) is fastened about the inner diameter lip edge 56 (also termed a reduced diameter nipple connection).

Also illustrated in FIG. 5 at 59 is one potential variant of a pressure sensor applied within the illustrated section 46 exterior skin of the sealed membrane and, in operation, is provided to reflect any changes in pressure resulting from compromise of the underlying piping or ductwork 48. Given the fluid tight sealing nature of the individual vapor sections 44, 46, et seq., it is envisioned that the provision of a suitable sensor 59 in embedded fashion within each membrane section (this including mounting the sensor in the manner illustrated in which a base component of the sensor 59 is exposed on the outside of the skin/membrane 46, as well as reconfiguring to mount entirely underneath the membrane with either wires or a wireless transmitting portion projecting through sealed locations) will assist in quickly identifying and localizing any breach occurring within the piping/ductwork. Additional or alternative to detecting pressure variations, it is envisioned that each of the sensors 59 can be reconfigured to detect other parameters such as moisture.

As further shown in both FIGS. 2 and 5, a succeeding section of insulation material 60 is positioned over a further extending portion of the pipe and is further notched or otherwise deflected internally at 62 (FIG. 5) so as to seat over the inner lip (nipple) edge 56 and in generally abutting contact with the radial profile 52 of the configured boot. An outer membrane layer associated with the wrap section 46 is then applied over the insulation later and in generally overlapping fashion with a circumferential edge band associated with the preceding membrane section 44.

As further shown in FIG. 1, a heat knife 64 is then provided for heat weld sealing the membrane layers directly to one another in a seamless fashion. A box cutter or other suitable knife edge (see at 66 in FIG. 3) is provided for creating a manual incision (further shown at 67 in reference to membrane 44) for providing a break in the thermal wrapping at periodic sections and in order to maintain and absolute vapor barrier for each section. The incision 67 depicted is understood as being located within a dedicated section of membrane and while maintaining a vapor barrier integrity of an adjoining section.

FIG. 4 illustrates a sectional cutaway of pipe 48 at a further location, such as generally corresponding to outer membrane wrapped section 32 shown in FIG. 1 at which the pipe penetrates at a location through a roof aperture. This is further represented by roof substrate layers 68 and 70 and underlying structural deck 72. Successive sections of insulation are shown at 74 and 76, wrapped around the pipe 48 at the general location in which it projections above the uppermost roof substrate 68.

In sealing the projecting location through the roof, a lower associated outer membrane wrapping 78 is configured over the lower insulation section 74 and terminates in an end surface 80 narrowing to an inner diameter (nipple) portion 82 which contacts the pipe 48. The nipple portion is usually placed over a volume of putty and prior to be affixed with a surrounding fastener directly to the pipe. A non-curing and low expanding foam sealant 84 is then applied between the outer diameter of the membrane wrapping 78 and the inner rim aperture of the roof substrates and structural decking.

Further components include a further horizontally applied layer of membrane 86 (see also FIG. 1) applied over the roof membrane 12 and exposed sealant 84 and lower membrane end surface 80, the membrane 86 exhibiting an inner diameter nipple portion 88, in this instance which overlaps the nipple portion 82 previously described and prior to the application of the mechanical band or fastening clamp 90. At this point, a seamless bonding material in the form of a further version of pre-manufactured or pre-configured boot is provided, see with first 92 and second 94 interconnected and angled sides encircling and overlaying both the level membrane 12 and upwardly extending membrane wrap 32, the boot 92 exhibiting a similar thermo-formable material and being heat welded directly to the adjoining membrane layers 12 and 32. Other post-application steps include applying a silicon based caulking along an exterior of the vapor barrier, as well as between the structural decking and pipe wrap.

As previously described, the outer membrane (TPO or PVC) of each subsequent section of pipe is heat bonded in a further overlapping fashion to the outer diameter extending edges of the outermost TPO or PVC pipe wrap proximate to its reduced diameter nipple connection. The outer wrapping is again broken at periodic sections to provide a thermal break and absolute vapor barrier for each section. The pre-manufactured boots, including such as depicted at 52 disposed between succeeding and overlapping sections of pipe membrane, as well as at 86/92 in sealing application over a roof aperture through which the pipe extends, can be individually sized at varying diameters (such as without limitation according to any incrementing dimensions ranging from 1" to 30") and other dimensions, this in order to be quickly and repetitively installed during a roof sealing application, this further based upon the sizing of the pipe and overlapping insulation.

Figure 6:
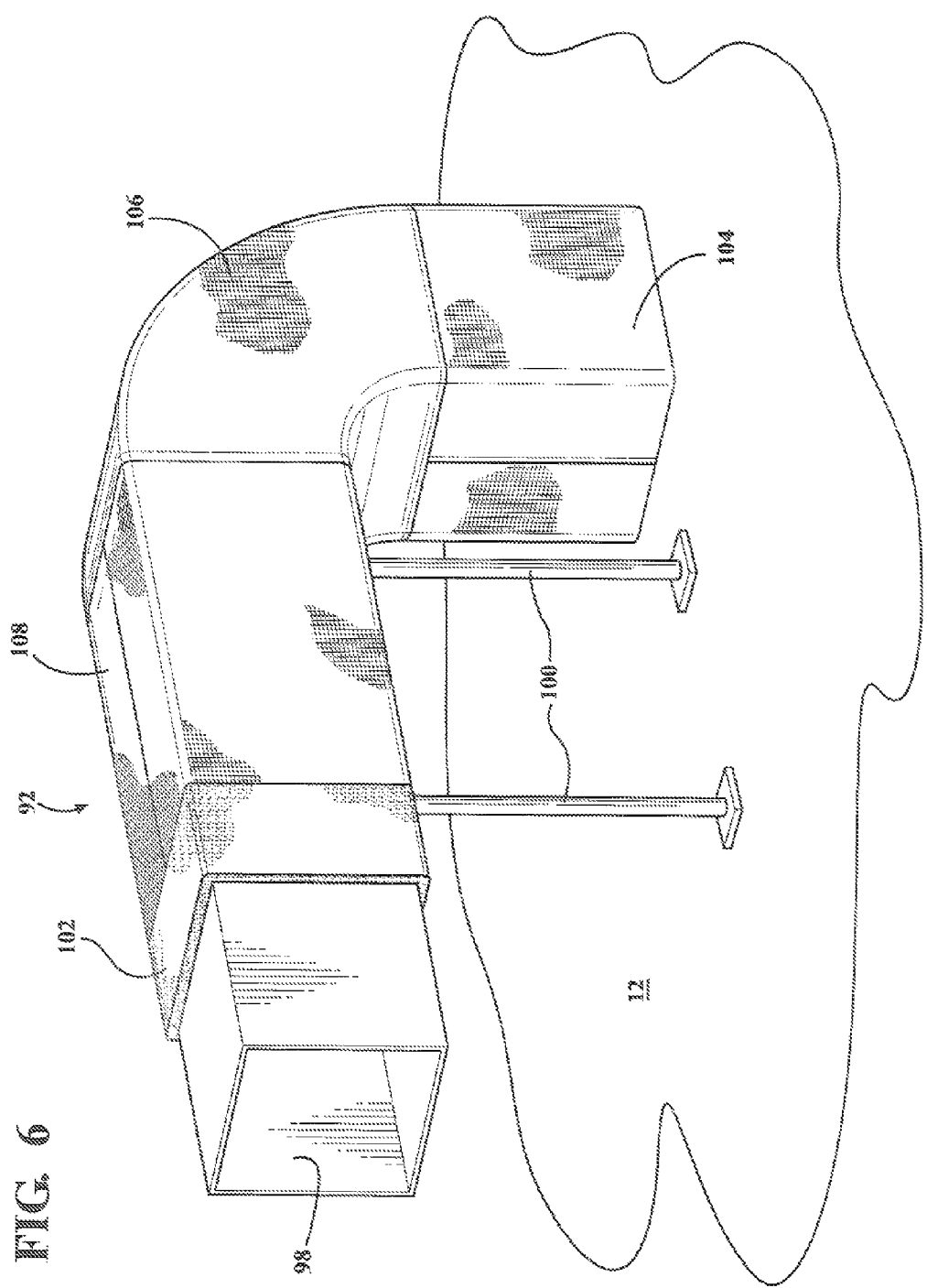
FIG. 6 is a sectional perspective of a similar sub-application to that shown in FIG. 2 applied to a length of ductwork.

Referring now to FIG. 6, a sectional perspective is generally shown at 96 of a similar sub-application to that shown in FIG. 2, and in this instance applied to a length of ductwork 98, and which is shown extending in projecting and angled fashion from the rooftop over which the membrane 12 is applied. As shown, the ductwork 98 exhibits upward, angled corner and horizontal interconnected sections and is further supported upon the rooftop by any number of vertical supports 100.

Similar to the piping applications previously described, a four sided layer of duct insulation 102 is folded or otherwise fitted over the exposed surface of the ductwork 98. Following this, a series of sections of flexible membrane (again including PVC, TPO or the like) are inter-fitted and mechanically heat sealed together. These membrane sections include a boot section 104 applied over the upward (roof projection duct section), a corner section 106 applied over the angled intermediate location succeeding the upward projecting section, and a further membrane section 108 applied over the ductwork and insulation in a further partially overlapping and transitioning location from the angled corner section 104. As further previously described, the membrane sections 104-108 exhibit a similar material constructed as utilized with the piping and rooftop membrane sections.

Figure 7:
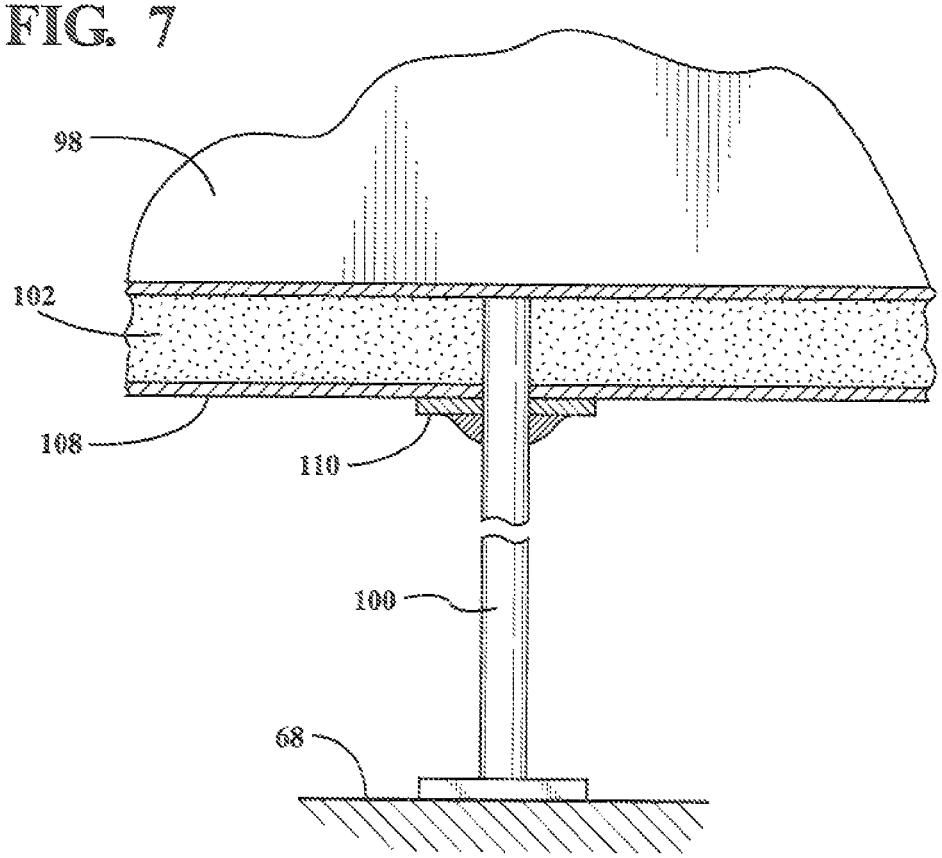
FIG. 7 is a side profile view of an underside of the ductwork shown in FIG. 6 and further illustrating the feature of an underside positioned and seamlessly incorporated separation washer.

Referring further to FIG. 7, a side profile view is shown of an underside of the ductwork 98 shown in FIG. 6 and further illustrating the feature of an underside positioned and seamlessly incorporated separation washer 110 arranged about a proximate extending location of the associated support 100 and between an underside location of associated outer membrane wrap section 108. During installation, the separation washer 110 is dimensioned to provide underside support to the membrane section 108 and insulation 102 and to further prevent sagging or tearing.

Referring again to FIG. 1, the provision of customized boot sections is again envisioned in a ductwork sub-application of the vapor barrier membrane, see at 112, and which can be used cooperatively with any given running membrane section 114 in order to seal a given ductwork location extending from the rooftop surface to such as a further given item of HVAC equipment 116. Related applications envision mechanically inter-engaging the membrane sections using either again a hot knife (at 64 in FIG. 2) or heated air in order to inter-weld the overlapping sections of membrane.

FIG. 9 is a sectional perspective illustration of open boot, such as shown in cutaway plan view in FIG. 4 see with first 92 and second 94 interconnected and angled sides and which is again associated with a generally rounded cross sectional pipe. FIG. 10 is a succeeding sectional perspective illustration of a further variant of open boot associated with a roof projecting location of a square shaped ductwork and which likewise includes first 118 and a second 120 interconnected and angled sides. In each instance, exposed and opposing wrap-around edges are provided for each boot along its entire extending length established by the interconnecting sides and to permit the boot to be fashioned around a suitably dimensioned pipe or ductwork, with the flap edges (see at 122 & 124 in FIG. 9 and at 126 & 128 in FIG. 10) subsequently being heat sealed together.

Figure 11:
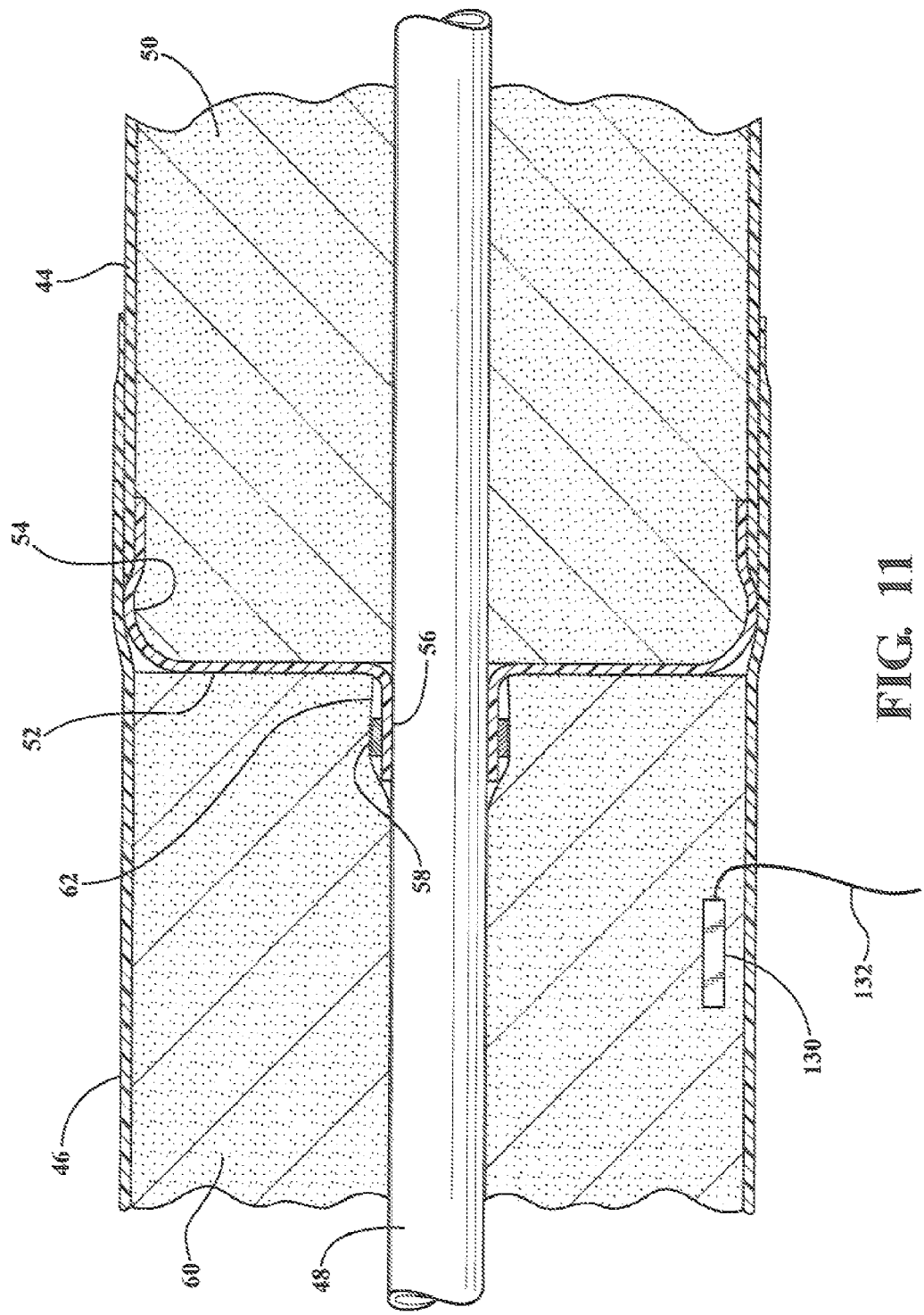
FIG. 11 is a depiction similar to the plan cutaway view of FIG. 5 and further illustrating a sensor contained within a given and pre-sealed membrane section and such as embedded within the insulating material, a flexible antenna projecting through the surface and allowing a transmitter associated with the sensor to communicate readings specific to that section to a remote monitoring device.
Figure 12:
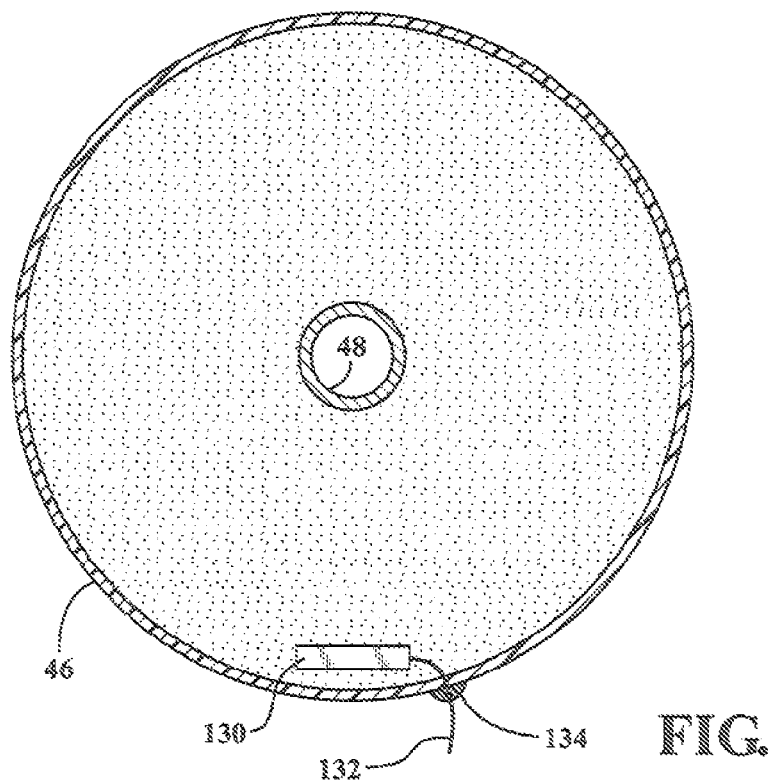
FIG. 12 is an end cutaway view of a selected conduit, insulating material and outer sealed membrane such as depicted in FIG. 11 and further showing a variant of the embedded sensor suspended within the insulating material and including a surface located protuberance surrounding the projecting location of the antenna wire in order to avoid compromising the internal conditions created within the membrane or envelope.
Figure 13:
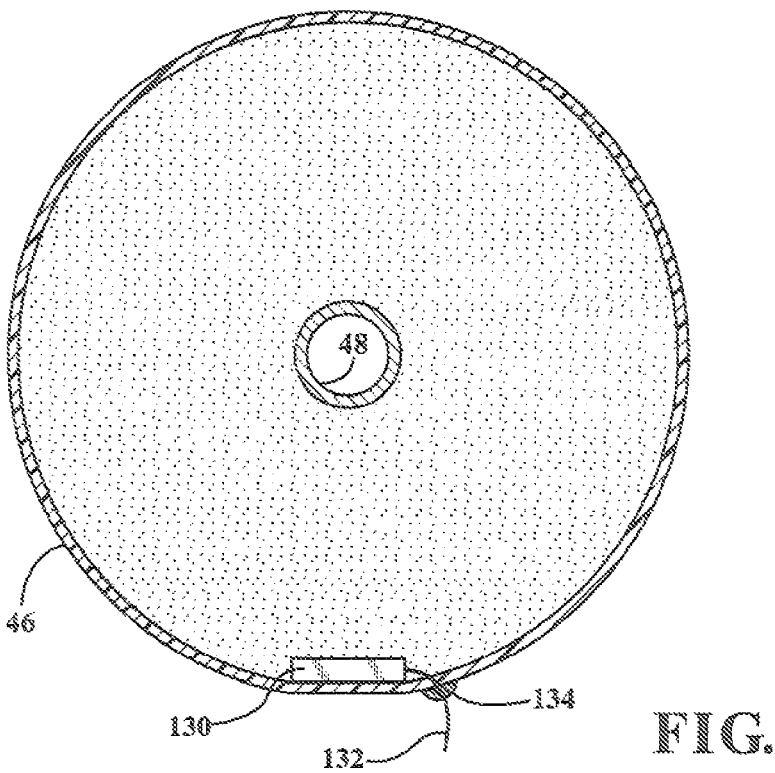
FIG. 13 is a substantially identical illustration to that shown in FIG. 12 in which the sensor is depicted mounted to the inside surface of the sealing membrane.

FIG. 11 is a depiction similar to the plan cutaway view of FIG. 5 and further illustrating a sensor 130 contained within previously identified and pre-sealed membrane section 46. As further also depicted in end cutaway in FIG. 12, the sensor 130 can be suspended within the insulating material 60 surrounding the conduit 48 and in turn covered by the surface membrane 46. Alternatively, and as is further shown in FIG. 13, the sensor 130 is depicted mounted directly to the inside surface of the sealing membrane 46.

In the illustrated variants, the sensor 130 is presented as a pressure sensor incorporated into each individual membrane (or section). It is also understood and envisioned that the sensors can be designed or substituted to provide any one or more function such as for reading pressure, moisture, gas detection, temperature and/or any other parameter (singularly or in combination) which is desirous for maintaining effectiveness and integrity of the membranes.

The present invention contemplates, according to one non-limiting variant, incorporating an individual sensor 130 (such further exhibiting any suitably shaped body which houses a processor, power supply, and transmitter) into each succeeding and individually sealing membrane or envelope extending along the length of the pipe or other conduit section. Such can include the membrane sections being heat staked or otherwise sealed at each boot or succeeding/overlapping location.

Figure 8:
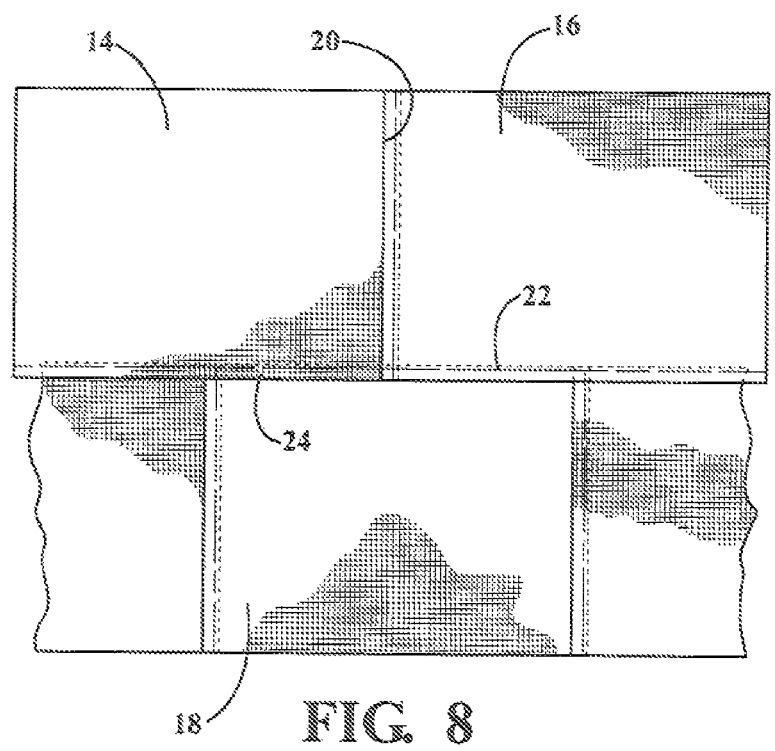
FIG. 8 is an illustration of the aligning and overlapping edges associated with a plurality of individual sheets of rooftop applied membrane which are heat bonded to one another to cover an exposed roof surface and which are further capable of being easily sectioned or trimmed in order to cooperate with penetrating pipe and HVAC locations as well as other rooftop located obstacles.

Other variants contemplate the membrane being reconfigured as a two ply envelope with pre-sealed and interconnected edges which are inter-engaged in overlapping fashion. Although not shown, it is also envisioned and understood that the pressure sensors can be configured so as to be incorporated into each of a plurality of planar roof mounting and partially overlapping membranes such as depicted in FIG. 8, as well as being applied to any suitable exposed surface exhibiting any conceivable profile and for which it is desirous to provide vapor barrier protection.

Additional features associated with the pressure sensor 130 include the provision of a flexible antenna 132 projecting through the membrane surface (again by example at 46 in each of FIGS. 11-13) and allowing the internal transmitter circuitry associated with the sensor to communicate pressure readings continuously monitored within that specific section to a remote monitoring device. As further depicted in each of FIGS. 12-13, a surface located protuberance 134 (such as exhibiting a suitable durometer rated and polymeric composite material) is formed upon the membrane exterior surface in surrounding fashion around the projecting location of the antenna wire 132, as well as the aperture in the membrane through which the wire 132 needs to pass. In this fashion, the additional sealing aspects are provided in order to avoid compromising the internal conditions created within the membrane or envelope and resulting from pressure disparities existing between the inside of the membrane section and the external environment being exploited through the wire passage aperture.

As previously indicated, additional features include the incorporation of pressure sensors into each of a plurality of interconnected and individually sealed envelopes, with intermittent vapor blocks likewise being formed in each individual section and extending along the length of the conduit (or within overlapping and edge connecting individual flattened roof sections). The further provision of the mini-processor and transmitter into each pressure sensor 130 enables the wire antenna 132 to communicate damage to any given section, such as incidental of tearing or other compromising of the sealing membrane, with the remote located receiver, and such as in turn envisioned to be incorporated into a processor operated alarm and/or notification assembly which can operate in dedicated wired, wireless or on-line based fashion in order to provide for remote detection and notification of any problem with that specific cell or envelope and without further necessitating inspection of the entire vapor barrier system.

In further variants, the covering membrane can further be provided as multiple sheets supported upon a skid or pallet or, alternatively, in a roll form in order to facilitate fast application and installation, such as in further combination with strategically located and pre-dimensioned boot sections for fitting with each of the rooftop, piping and ductwork in a single seamless and vapor barrier enabling application. In application, the flexible membranes are laid over the application specific insulation and are interlocked/heat sealed to the membrane boots and related mechanical components. Non-straight runs or irregular surfaces are typically addressed by the installer during fabrication, this again in combination with pre-sized boot components pre-manufactured for specific installation to a pipe or HVAC duct.

In use, the seamless vapor barrier system improves the energy efficiency of the associated thermo (by example refrigeration) system, and accomplishes this by providing a complete vapor barrier resulting from the inter-welding of the overlapping thermo edges of the membranes along all joints, seams, laps and the like established between each of the rooftop, piping and ductwork components. This entails in non-limiting fashion the provision of a vapor barrier to the fluid conveying pipes as well as sanitation provided by the air conveying ductwork. The sectionalized manner in which the membrane sections are inter-fitted further prevents a break or rupture at one location from compromising the overall effectiveness of the system.

An additional benefit of the present design is the ability to utilize separate vapor barrier sections in a number of applications, not limited to roofing, such as where hazardous materials are transported within the conduit (pipes or ducts). In this fashion, access is facilitated to any given section(s) without compromising the vapor barrier established within individual adjoining sections. This further enables an operator or isolate and repair a breach in any given section(s) without contaminating the balance of the piping or ductwork.

Having described my invention, other and additional preferred embodiments will become apparent to those skilled in the art to which it pertains, and without deviating from the scope of the appended claims.

I claim:

1. An assembly for sealing an exposed surface, comprising:
a plurality of thermoformed and individually scaling membrane sections, each provided in sheet form and configured for applying over an exterior of the surface, said membranes being directly heat welded to one another along overlapping edges in order to create a sectionalized and continuous vapor barrier across the surface;
a pressure sensor integrated into a selected membrane section, said sensor incorporating a power supply, a processor and a transmitter which is communicable with a remote monitoring device in order to notify of a problem within said specified membrane section; and
a wire antenna extending from said sensor and projecting from a surface of said membrane section, a surface located protuberance formed upon the membrane exterior surface in surrounding fashion around the projecting location of said antenna wire and aperture in said membrane through which said wire passes in order to avoid compromising the internal conditions created within said membrane section resulting from pressure disparities existing between the inside of said membrane section and the external environment being exploited through the wire passage aperture.

2. The assembly as described in claim 1, further comprising a layer of insulation disposed between said membrane sections and the exposed surface, said sensor being suspended within said insulation or interposed between said insulation and an inner surface of said membrane section.

3. The assembly as described in claim 1, said surface protuberance further comprising a durometer rated and polymeric composite material.

4. The assembly as described in claim 1, the exterior surface further including a rooftop and at least one type of projecting conduit including either a pipe or an HVAC duct, said assembly further comprising a boot shaped membrane applied over and directly welded to an interfacing location established between a proximate rooftop membrane section and a further conduit wrapped section in order to provide a vapor barrier across the roof and conduit.

5. The assembly as described in claim 4, said boot further comprising an outer radially extending portion and an inner diameter extending nipple portion contacting an exposed surface of said conduit, a mechanical fastener applied over said inner nipple portion.

6. The assembly as described in claim 4, said boot shaped membrane further comprising an outer angled lip edge welded to an adjoining membrane corresponding to a succeeding conduit covering.

7. The assembly as described in claim 4, each of said membrane sections and boot shaped membrane further comprising a material selected from the group consisting of a thermoplastic olefin or a polyvinyl chloride.

8. The assembly as described in claim 4, said conduit further exhibiting a four sided duct including underside extending supports for elevating above the roof, said assembly further comprising an underside positioned separation washer arranged about a proximate extending location of an associated support and between an underside location of an associated outer membrane, said washer being dimensioned to provide underside and separating support to said membrane section and to prevent sagging or tearing.

9. An assembly for environmentally sealing a conduit projecting from a rooftop location, comprising:
a first rooftop supported membrane surrounding the projecting conduit;
a further plurality of membranes in communication with said rooftop supported membrane and configured for applying about an extending length of the conduit, said membranes directly heat welded to one another along overlapping edges:
a first boot adapted to being applied over an initial location of the conduit projecting from the rooftop and in order to provide a seal between said first membrane and an initial conduit applied membrane, said first boot further comprising an outer radially extending portion partially overlaying said first membrane as well as an inner diameter extending nipple portion contacting an exposed surface of said conduit;
a second boot applied over a succeeding spaced location of the conduit relative to said first boot, said second boot comprising a narrowed diameter lip edge secured to the conduit and an opposite directed and outer diameter angled lip edge welded to an adjoining conduit applied membrane corresponding to a succeeding conduit covering;
a layer of insulation located underneath each of said first membrane and also disposed between each of said conduit applied membranes and conduit in segmented fashion separated by said boots, said assembly adapted to providing a vapor barrier across the conduit; and
a sensor integrated into a selected membrane, said sensor incorporating a power supply, a processor and a transmitter which is communicable with a remote monitoring device in order to notify of a problem within said specified membrane.

10. The assembly as described in claim 9, further comprising a layer of insulation disposed between said membranes and the exposed surface, said sensor being suspended within said insulation or interposed between said insulation and an inner surface of said membrane.

11. The assembly as described in claim 9, further comprising a wire antenna extending from said sensor and projecting from a surface of said membranes.

12. The assembly as described in claim 11, said sensor further comprising a pressure sensor, a surface located protuberance formed upon the membrane exterior surface in surrounding fashion around the projecting location of said antenna wire and aperture in said membrane through which said wire passes in order to avoid compromising the internal conditions created within said membrane section resulting from pressure disparities existing between the inside of said membrane section and the external environment being exploited through the wire passage aperture.

13. The assembly as described in claim 12, said surface protuberance further comprising a durometer rated and polymeric composite material.

14. The assembly as described in claim 9, each of said membrane sections and boots boot shaped membrane further comprising a material selected from a the group including consisting of a thermoplastic olefin or a polyvinyl chloride.

15. The assembly as described in claim 9, said conduit further exhibiting a four sided duct including underside extending supports for elevating above the roof, said assembly further comprising an underside positioned separation washer arranged about a proximate extending location of an associated support and between an underside location of an associated outer membrane, said washer being dimensioned to provide underside and separating support to said membrane section and to prevent sagging or tearing.

16. An assembly for sealing a rooftop and at least one type of projecting conduit including at least one of a projecting pipe or an HVAC duct, comprising:
    a plurality of thermoformed membranes provided in sheet form and which are configured for applying over an exterior of the rooftop, said membranes being directly heat welded to one another along overlapping edges in interlocking fashion;
    a further plurality of membranes configured for applying about an extending length of the conduit and likewise being directly heat welded to one another along overlapping edges; and
    a boot shaped membrane applied over and directly welded to an interfacing location established between a proximate rooftop membrane and a further conduit wrapped membrane;
    said boot further comprising an outer radially extending portion and an inner diameter extending nipple portion contacting an exposed surface of said conduit, a mechanical fastener applied over said inner nipple portion;
    a sensor integrated into each of said membranes and for reading any one or more of pressure, moisture and gas parameters existing within a specified membrane, said sensors each incorporating a power supply, a processor and a transmitter which is communicable with a remote monitoring device in order to notify of a problem within the membrane, a wire antenna extending from said sensor and projecting from a surface of said membranes; and
    said assembly adapted to providing a vapor harrier across the roof and conduit.

17. The assembly as described in claim 16, further comprising a layer of insulation disposed between said membranes and the exposed surface, said sensor being suspended within said insulation or interposed between said insulation and an inner surface of said membrane.

18. An assembly for sealing an exposed surface, comprising:
    a plurality of thermoformed and individually sealing membrane sections, each provided in sheet form and configured for applying over an exterior of the surface, said membranes being directly heat welded to one another along overlapping edges in order to create a sectionalized and continuous vapor barrier across the surface;
    the exterior surface further including a rooftop and at least one type of projecting conduit including either a pipe or an HVAC duct, said assembly further comprising a boot shaped membrane applied over and directly welded to an interfacing location established between a proximate rooftop membrane section and a further conduit wrapped section in order to provide a vapor barrier across the roof and conduit
    said boot shaped membrane further having an outer angled lip edge welded to an adjoining membrane corresponding to a succeeding conduit covering; and
    a sensor integrated into a selected membrane section, said sensor incorporating a power supply, a processor and a transmitter which is communicable with a remote monitoring device in order to notify of a problem within said specified membrane section.

19. An assembly for sealing an exposed surface, comprising:
    a plurality of thermoformed and individually sealing membrane sections, each provided in sheet form and configured for applying over an exterior of the surface, said membranes being directly heat welded to one another along overlapping edges in order to create a sectionalized and continuous vapor barrier across the surface;
    the exterior surface further including a rooftop and at least one type of projecting conduit including either a pipe or an HVAC duct, said assembly further comprising a boot shaped membrane applied over and directly welded to an interfacing location established between a proximate rooftop membrane section and a further conduit wrapped section in order to provide a vapor barrier across the roof and conduit;
    a sensor integrated into a selected membrane section, said sensor incorporating a power supply, a processor and a transmitter which is communicable with a remote monitoring device in order to notify of a problem within said specified membrane section; and
    conduit further exhibiting a four sided duct including underside extending supports for elevating above the roof, said assembly further having an underside positioned separation washer arranged about a proximate extending location of an associated support and between an underside location of an associated outer membrane, said washer being dimensioned to provide underside and separating support to said membrane section and to prevent sagging or tearing.

* * * * *